United States Patent
Shen et al.

(10) Patent No.: US 7,825,993 B2
(45) Date of Patent: Nov. 2, 2010

(54) METHOD AND COMPUTER READABLE MEDIA FOR SCANNING VIDEO SOURCES

(75) Inventors: Shih-Tong Shen, Taipei (TW); Kuang-Peng Ho, Taipei (TW)

(73) Assignee: Acer Incorporated, Taipei (TW)

( * ) Notice: Subject to any disclaimer, the term of this patent is extended or adjusted under 35 U.S.C. 154(b) by 1125 days.

(21) Appl. No.: 11/462,514

(22) Filed: Aug. 4, 2006

(65) Prior Publication Data
US 2007/0216817 A1 Sep. 20, 2007

(30) Foreign Application Priority Data
Mar. 15, 2006 (TW) .............................. 95108843 A

(51) Int. Cl.
*H04N 5/268* (2006.01)
(52) U.S. Cl. .................... 348/705; 348/554; 348/706
(58) Field of Classification Search ......... 348/705–706, 348/722, 734, 569, 558, 659–661, 725, 553–555, 348/552; 725/37, 93
See application file for complete search history.

(56) References Cited

U.S. PATENT DOCUMENTS

| | | | | |
|---|---|---|---|---|
| 5,264,929 | A * | 11/1993 | Yamaguchi | 348/159 |
| 5,444,499 | A * | 8/1995 | Saitoh | 348/734 |
| 6,133,910 | A * | 10/2000 | Stinebruner | 725/49 |
| 7,573,536 | B2 * | 8/2009 | Paulsen | 348/722 |
| 2002/0188772 | A1 * | 12/2002 | Radcliffe et al. | 710/38 |
| 2005/0073914 | A1 * | 4/2005 | Yabe | 369/30.01 |
| 2007/0153132 | A1 * | 7/2007 | Jong | 348/705 |

* cited by examiner

*Primary Examiner*—Trang U Tran
(74) *Attorney, Agent, or Firm*—Kirton & McConkie; Evan R. Witt

(57) ABSTRACT

The present invention suggests a simplified and robust scanning method as a scenario for scanning video sources of a display device such as a TV or projector. The inventive method is attained by way of grouping the video sources and prioritizing the scanning priority for each video source group in terms of the viewing time statistic or the frame number statistic of each video source group. Therefore, the display device is capable of scanning each video source group based on the scanning priority to discover if there is a video signal inputted into the video source.

27 Claims, 13 Drawing Sheets

METHOD AND COMPUTER READABLE MEDIA FOR SCANNING VIDEO SOURCES

FIELD OF THE INVENTION

The present invention is related to a scanning method for video sources, and more particularly to a scanning method for video sources that are allowed for providing an input video signal to a display device such as a TV or projector, in which the scanning method is executed according to the scanning priority prioritized in terms of the statistic indicative of the viewing time or the frame number of the video source groups.

BACKGROUND OF THE INVENTION

With the versatility of video display toolkit and the progress of video streaming technique, various video display devices and software products have been developed to satisfy the miscellaneous needs of user. Therefore, the display device is required to be connectable with various video sources in order to provide wide-screen visual effect to the user. For example, a contemporary TV is configured to be connectable with a multiplicity of video sources, such as video camera, portable computer, DVD device, and digital video recording/reproduction device. With the increase of the A/V peripheral device, a TV is necessary to build a variety of video input/output interfaces to access video signals promulgated with different audio/video specifications.

In the past, when a TV is powered on, the user has to manipulate the TV to scan each video source of the TV in order to determine if there is a video signal inputted into the TV. When the TV receives an input video signal, the input video signal will be decoded for playing. However, with the increase of the number of A/V peripheral devices connected with TV, the user has to wait for the TV to scan each video sources of the TV or maneuver the controller of the TV to search the desired video signals from the connected A/V peripheral devices. Such manual operation would result in a waste of time and inconvenience of operation.

Therefore, there is a need to develop a scanning method for video sources, in which the viewing time statistic or frame number statistic of the video source groups is used as a criteria to prioritize the scanning priority for the video source groups, such that each video source groups is scanned according to the scanning priority to determine if there is a video signal inputted into the video sources. The present invention can satisfy these needs.

SUMMARY OF THE INVENTION

An object of the present invention is to provide a scanning method for video sources, in which the video sources of a display device is grouped and the scanning priority of each video source group is prioritized in terms of the viewing time statistic of each video source group, such that the display device can discover the video source which is providing an input video signal to the display device.

Another object of the present invention is to provide a scanning method for video sources, in which the video sources of a display device are grouped and the scanning priority of each video source group is prioritized in terms of the frame number statistic of each video source group, such that the display device can discover the video source which is providing an input video signal to the display device.

According to a primary aspect of the present invention, a scanning method for video sources of a display device is provided and includes the steps of: (a) grouping a plurality of video sources into a plurality of video source groups; (b) calculating a statistic of each video source group; (c) prioritizing a scanning priority for each video source group according to the statistic of each video source group; and (d) scanning each video source group according to the scanning priority of each video source group to determine if there is a video signal inputted into the video sources.

According to another aspect of the present invention, a computer readable medium having computer-executable instructions for enabling a computer to accomplish a scanning method for the video sources of a display device is provided, in which the scanning method for the video sources includes the steps of: (a) grouping a plurality of video sources into a plurality of video source groups; (b) calculating a statistic for each video source group; (c) prioritizing the scanning priority for each video source group according to the statistic of each video source group; and (d) scanning each video source group according to the scanning priority of each video source group to determine if there is a video signal inputted into the video sources.

Now the foregoing and other features and advantages of the present invention will be best understood through the following descriptions with reference to the accompanying drawings, wherein:

DETAILED DESCRIPTION OF THE PREFERRED EMBODIMENT

Several preferred embodiments embodying the features and advantages of the present invention will be expounded in following paragraphs of descriptions. It is to be realized that the present invention is allowed to have various modification in different respects, all of which are without departing from the scope of the present invention, and the description herein and the drawings are to be taken as illustrative in nature, but not to be taken as limitative.

The present invention presents a scanning method for video sources, in which the scanning method is executed by grouping the video sources of a display device and prioritizing the scanning priority for each video source group in terms of the viewing time statistic indicative of the viewing time of a video source group or the frame number statistic indicative of the number of played frames of a video source group, in order to enable the display device to discover which video source is providing an input video signal to the display device when a video signal is inputted into the video sources.

Figure 1:
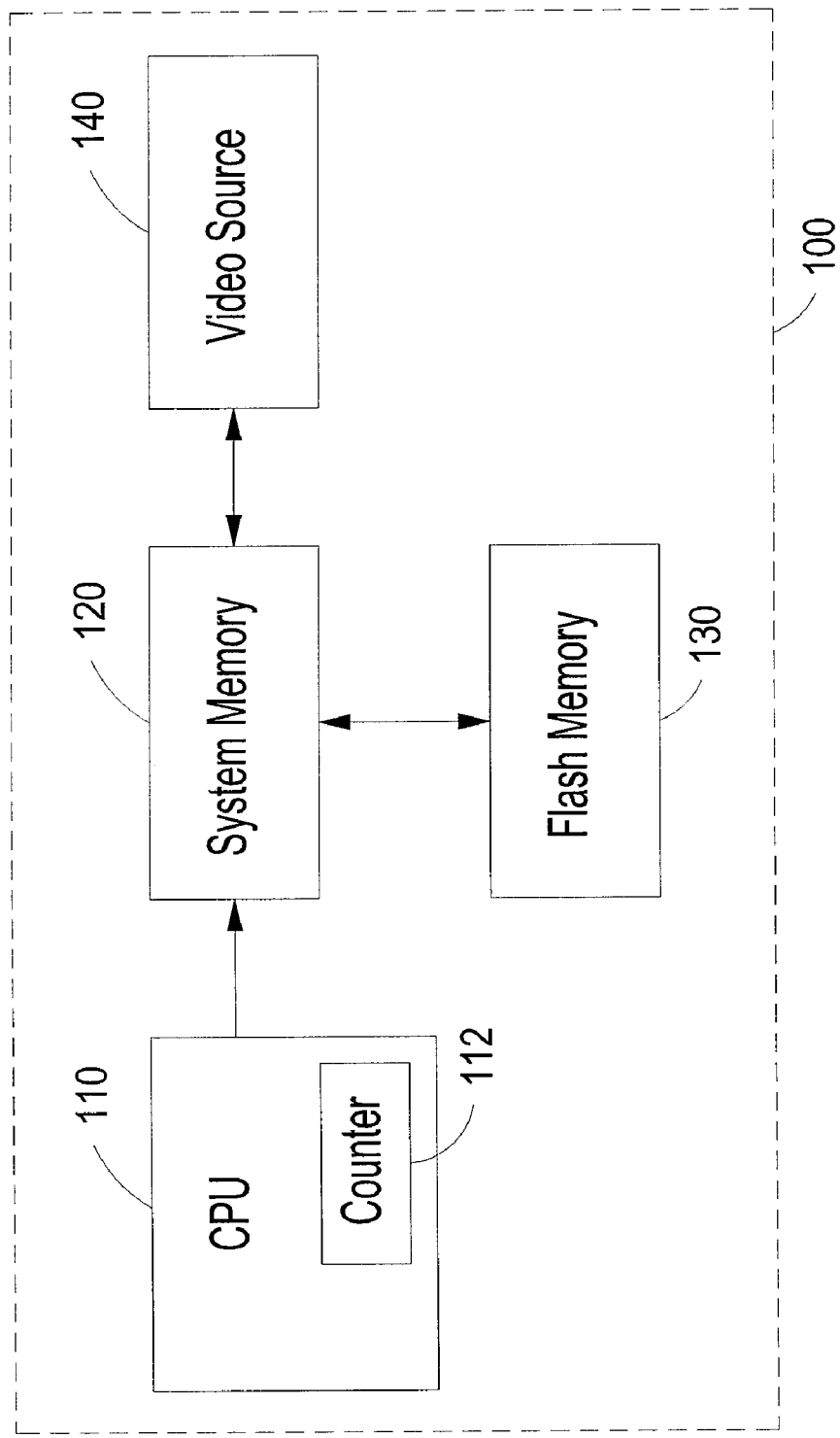
FIG. 1 is a systematic block diagram showing the system for implementing the scanning method for video sources according to the present invention.

FIG. 1 shows a systematic block diagram outlining the system for performing the scanning method for video sources according to the present invention, in which the system is built in a display device 100, such as a TV or projector. In FIG. 1, a CPU 110 is configured to execute instructions for video decoding and playing. The CPU 110 is connected to a system memory 120 that is configured to store operational data during the video decoding process. The display device 100 is configured to communicate with external video display devices via the video sources 140, which are configured to allow video signals to be inputted into the display device 100 and played by means of the manipulation of the CPU 110. The CPU 110 includes a counter 112 that is configured to calculate the viewing time statistic indicative of the viewing time of a video source group or calculate the frame number statistic indicative of the number of played frames of a video source group. The statistic derived from the calculations of the counter 112 is stored in the flash memory 130 that is connected to the system memory 120.

Figure 2A:
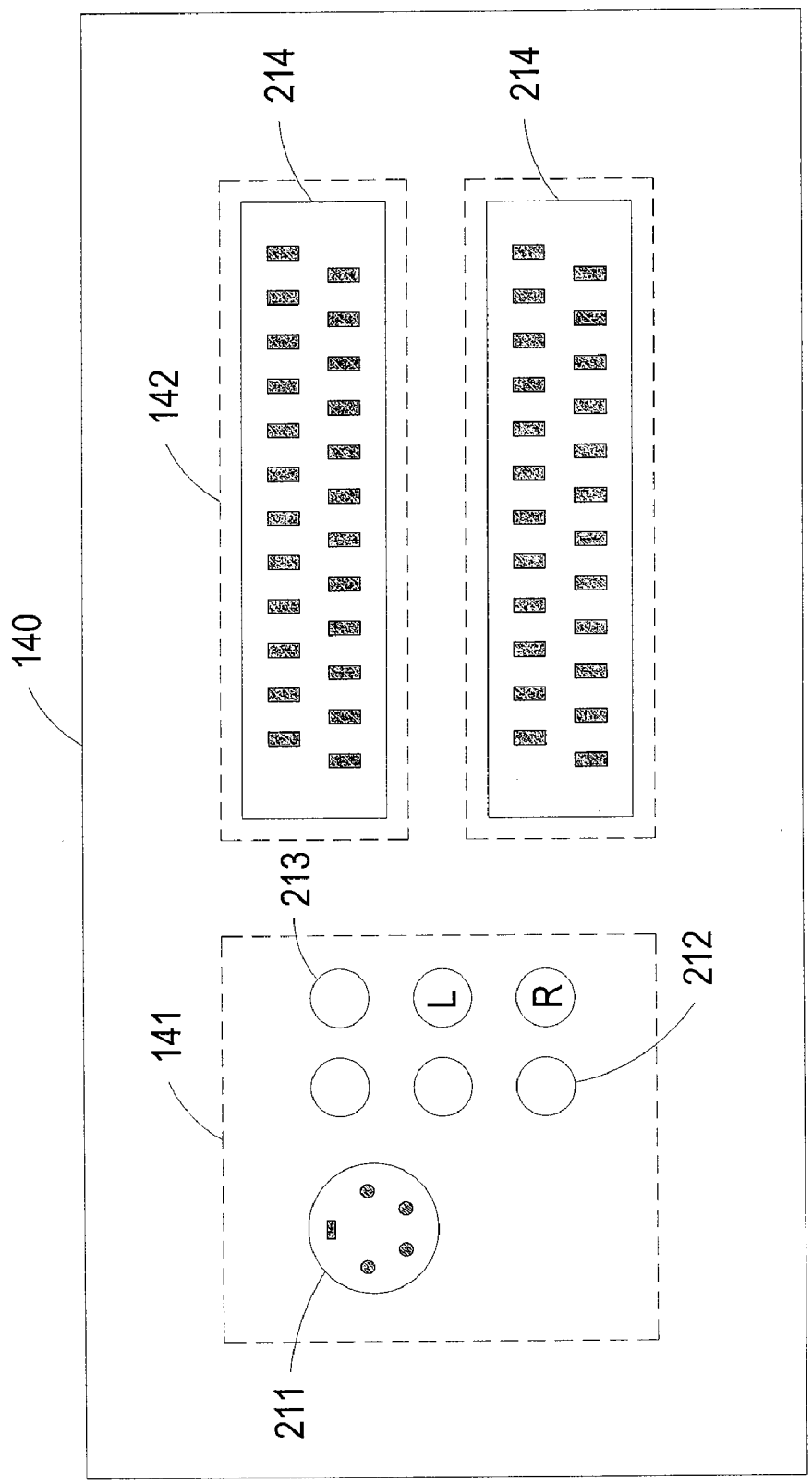
FIG. 2(A) and FIG. 2(B) respectively illustrate a first mode for grouping the video sources and a second mode for grouping the video sources according to the present invention.
Figure 3A:
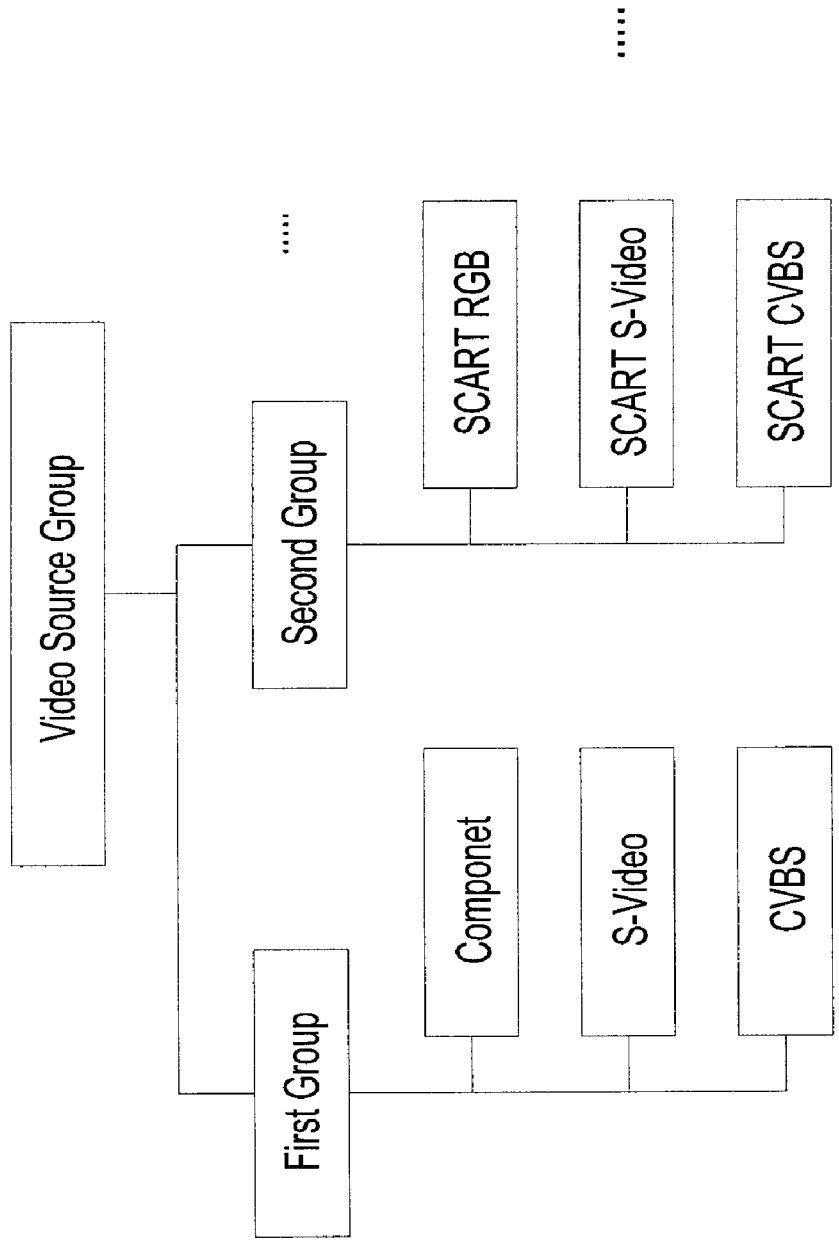
FIG. 3(A) and FIG. 3(B) respectively illustrate a first exemplification for grouping the video sources and a second exemplification for grouping the video sources according to the present invention.

FIG. 2(A) shows a first mode for grouping the video sources 140. In this example, the video sources 140 are represented by the video signal input interfaces of the display device 100, and the criteria of video source grouping are based on the shared audio channel. For example, the Component video source 212, the S-Video video source 211, and the CVBS video source 213 all share a shared audio channel, and all of them are grouped as a first video source group 141. The RGB video source, the S-Video video source, and the CVBS video source built in the SCART connector interface 214 are grouped as a second video source group. In addition, the video source having a higher resolution is assigned with a higher scanning priority in the same video source group. For example, the scanning priority of the video sources in the first video source group 141 is prioritized based on the resolution of the input video signal specified by the video source as: Component video source 212 >S-Video video source 211>CVBS video source 213, and the scanning priority of the video sources in the second video source group 142 is prioritized based on the resolution of the input video signal as: SCART/RGB video source>SCART/S-Video video source>SCART/CVBS video source. An exemplification of video source grouping with the topology of FIG. 2(A) is shown in FIG. 3(A).

Figure 2B:
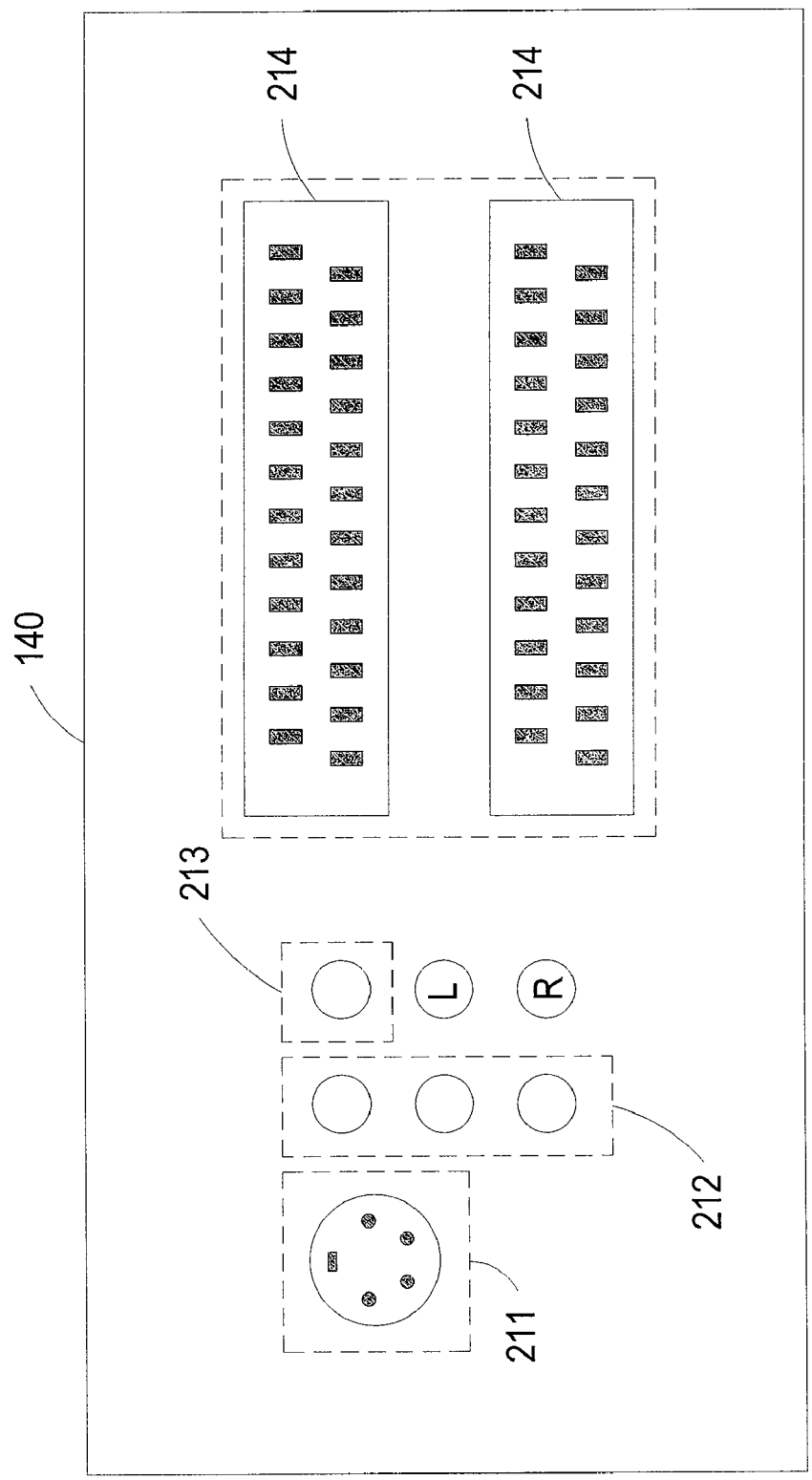
Figure 3B:
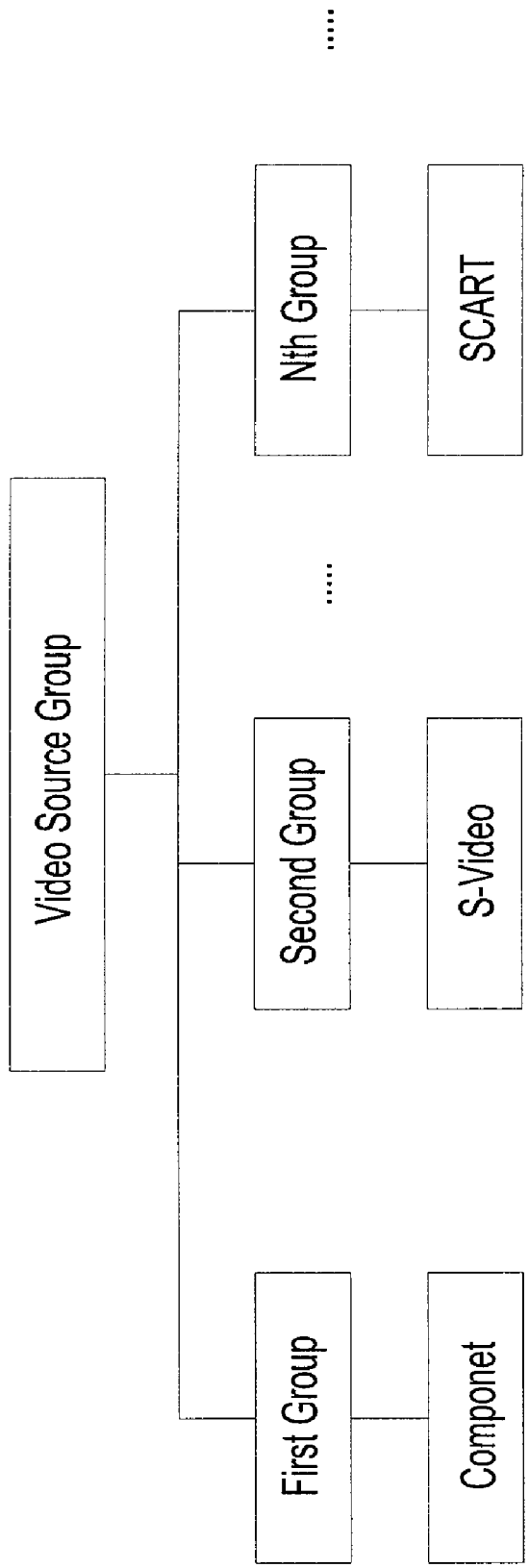

FIG. 2(B) shows a second mode for grouping the video sources 140. In this example, the video sources 140 are represented by the video signal input interfaces of the display device 100. In this example, each video source constitutes an individual video source group. For example, the video sources 140 are grouped into a Component video source group 212, a S-Video video source group 211, a CVBS video source group 213, and a SCART video source group 214. An exemplification of video source grouping with the topology of FIG. 2(B) is shown in FIG. 3(B).

Figure 4A:
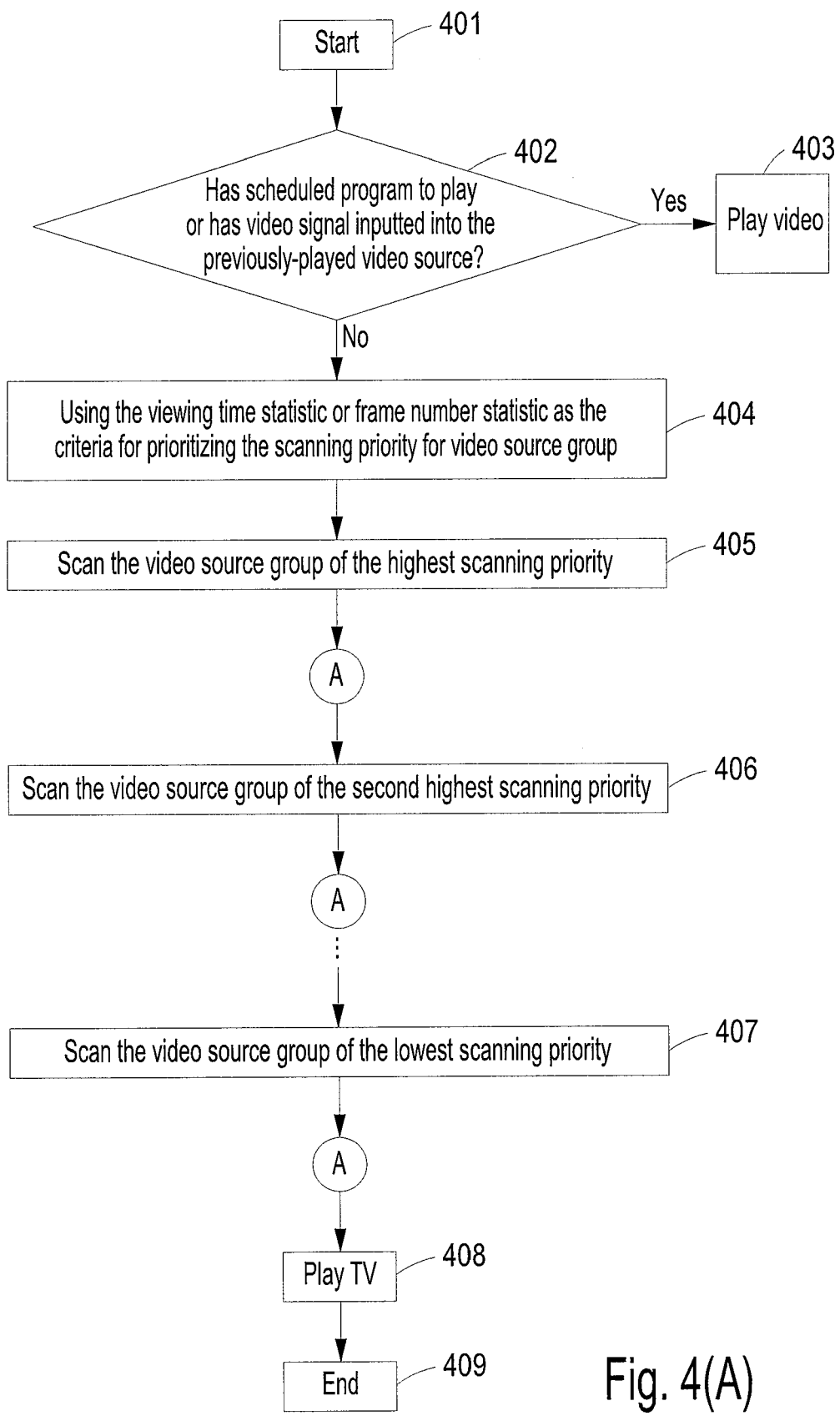
FIG. 4(A) illustrates the procedural steps of the main routine for performing the scanning method for video sources according to the present invention.
Figure 4B:
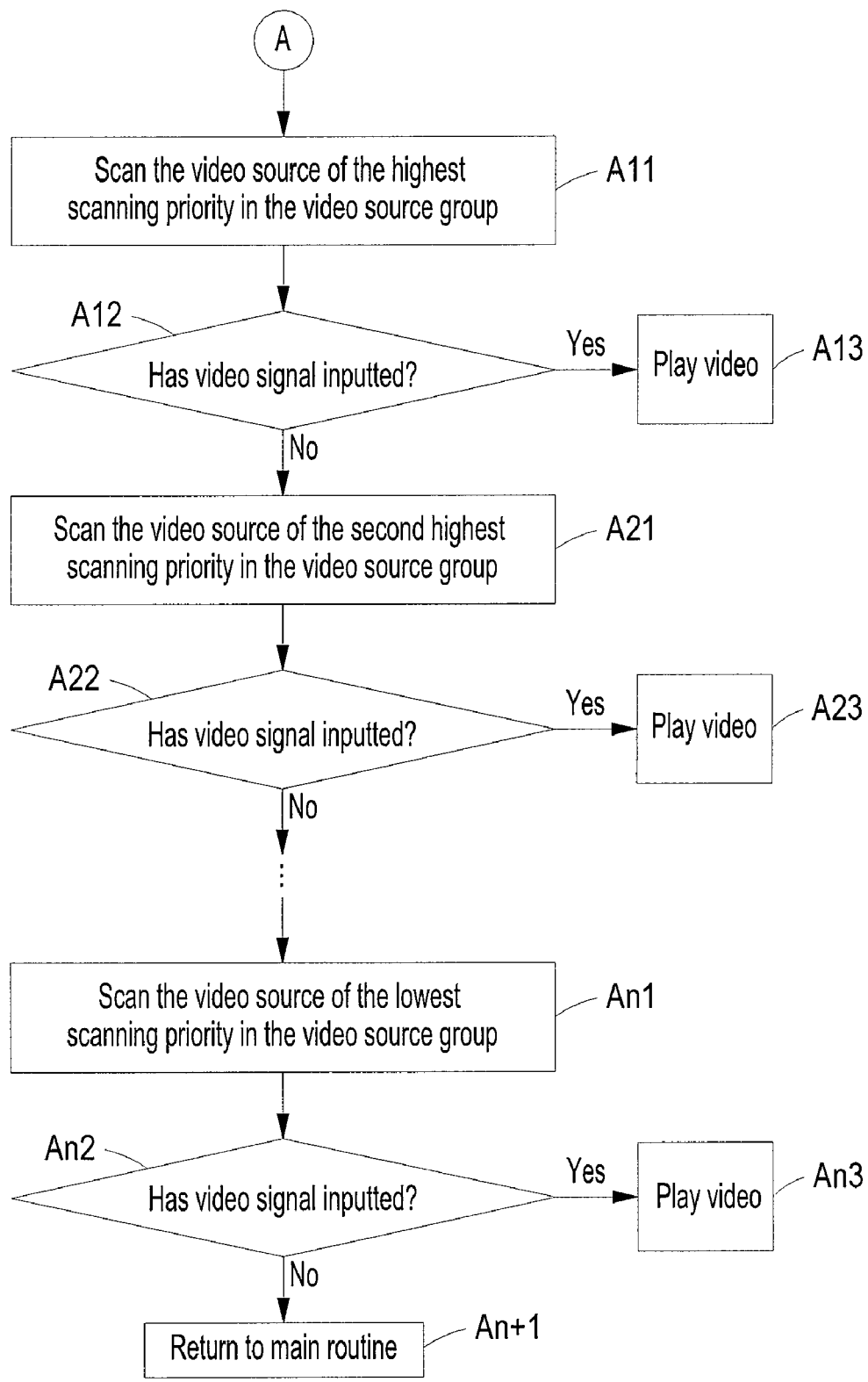
FIG. 4(B) illustrates the procedural steps of the subroutine A shown in FIG. 4(A)

FIG. 4(A) is a flowchart illustrating the procedural steps of the main routine for performing the scanning method for video sources according to the present invention, and FIG. 4(B) is a flowchart illustrating the procedural steps of the subroutine A shown in FIG. 4(A). The scanning method for video sources according to the present invention is described below with reference to FIG. 4(A) and FIG. 4(B):

Step 401: Start.

Step 402: Determine if there is a scheduled program to play or a video signal inputted into the previously-played video source. When the display device 100 is powered up, the display device may first determine if there is a scheduled program to play or a video signal inputted into the previously-played video source. When a scheduled program is about to play or a video signal is inputted into the previously-played video source, the process continues with step 403 to enable the CPU 110 to receive and decode the input video signal for playing. Otherwise, the process continues with step 404.

Step 404: Using the viewing time statistic or frame number statistic as the criteria for prioritizing the scanning priority for video source groups: When the display device 100 is powered up, and there is no scheduled program to play or no video signal inputted into the previously-played video source, the CPU 110 will use the viewing time statistic or frame number statistic as the criteria for prioritizing the scanning priority for each video source group. For example, if the grouping of the video sources is carried out in the form of the first mode, the Component video source, the S-Video video source, and the CVBS video source are grouped as a first video source group, and the RGB video source, S-Video video source, and CVBS video source built in the SCART connector interface are grouped as a second video source group. The CPU 110 is configured to compare the sum of the viewing time statistic or the sum of the frame number statistic of each video source in the first video source group with the sum of the viewing time statistic or the sum of the frame number statistic of each video source in the second video source group, and assign a higher scanning priority to the video source group having a greater viewing time statistic or frame number statistic. In the same group, however, the scanning priority of each video source is prioritized based on the resolution of the input video signal as: Component video source (RGB video source)>S-Video video source>CVBS video source. If the grouping of the video sources is carried out in the form of the second mode, each video source constitutes an individual video source group. In this manner, the CPU only needs to compare the viewing time statistic or the frame number statistic of each video source to determine the scanning priority for each video source group. In a preferred mode for carrying out the present invention, the viewing time statistic or the frame number statistic of each video source group is calculated by the counter 112 and recorded in the flash memory 130. Next, the process continues with step 405.

Step 405: Scanning the video source group of the highest scanning priority: At step 404, the scanning priority of each video source group is prioritized. Next, the scanning process begins with the video source group of the highest scanning priority. Next, the process continues with the subroutine A.

Please refer to FIG. 4(B), in which the procedural steps of the subroutine A shown in FIG. 4(A) are illustrated. The subroutine A is set to execute the scanning process for each video source in the same video source group. The process begins with step A11, in which the video source of the highest scanning priority in the video source group is scanned. At step A12, if there is a video signal inputted into the video source of the highest scanning priority, the CPU 110 is configured to receive and decode a video signal from the video source of the highest scanning priority for playing. If there is no video signal inputted into the video source of the highest scanning priority, the process continues with step A21 to scan the video source of the second highest scanning priority. The subroutine of the scanning process continues with an analogical manner to scan each video source in the video source group until step An1. At step An1, the video source of the lowest scanning priority is scanned. At step An2, if there is a video signal inputted into the video source of the lowest scanning priority, the CPU 110 is configured to receive and decode a video signal from the video source of the lowest scanning priority for playing. If there is no video signal inputted into the video source of the lowest scanning priority, the process continues with step An+1 and the control of the process returns to the main routine of FIG. 4(A).

Referring back to FIG. 4(A), if the video sources within the video source group of the highest scanning priority do not receive any input video signals, the video source group of the second highest scanning priority will be scanned at step 406. Next, the execution of the scanning process jumps to the subroutine A, in which the procedural steps thereof have been described above with reference to FIG. 4(B), and no further details is desired to be given herein.

Accordingly, the main routine of the scanning process continues with an analogical manner to scan each video source group. Next, the execution of the main routine goes to step 407, in which the video source group of the lowest scanning priority is scanned. If there is no video signal inputted into the video source group of the lowest priority, the scanning process continues with step 408 to enable the display device 100 to play TV programs. The execution of the main routine is terminated at step 409.

Figure 5A:
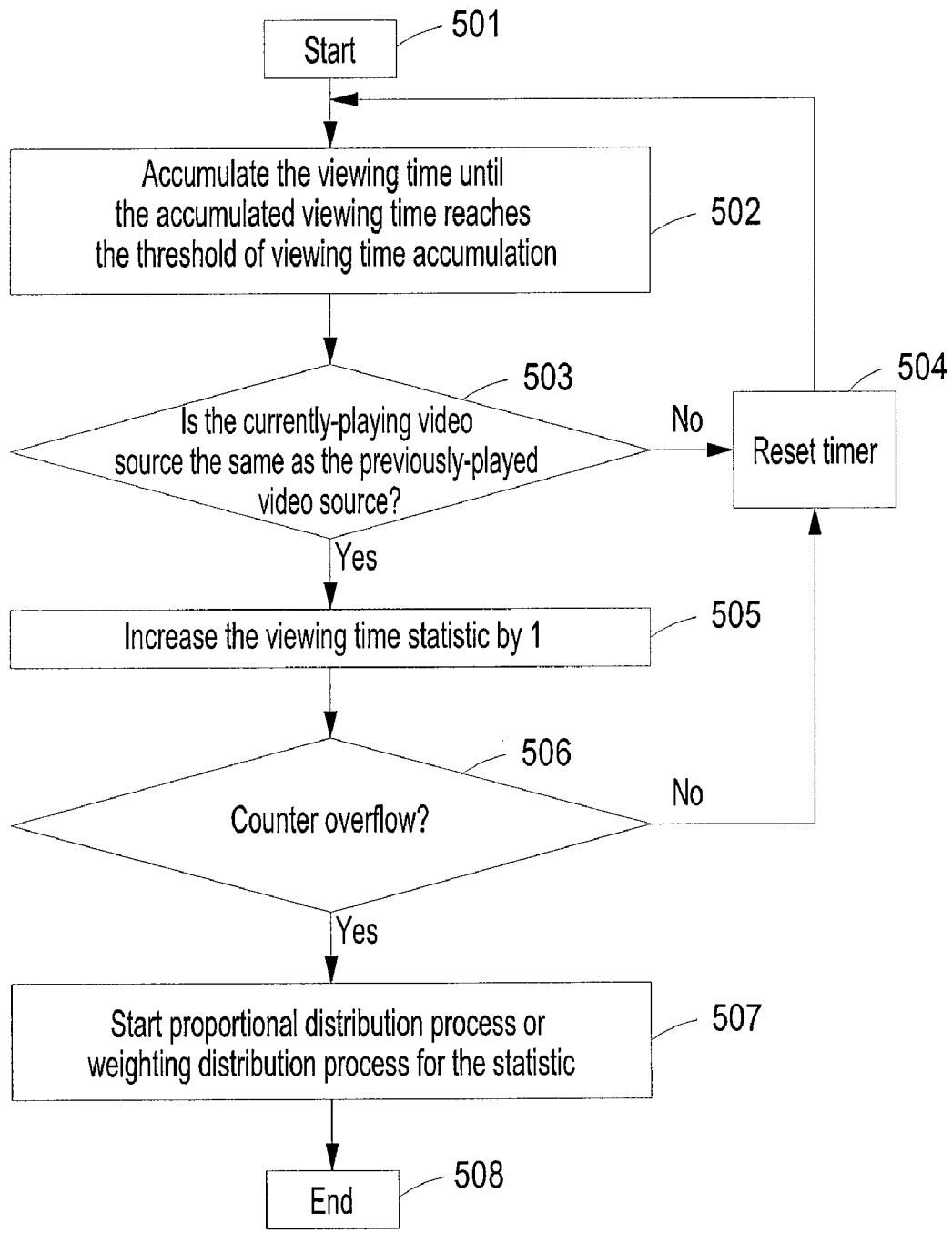
FIG. 5(A) illustrates an arithmetic process for calculating the viewing time statistic indicative of the viewing time of a video source group according to a first embodiment of the present invention.

FIG. 5(A) illustrates an arithmetic process for calculating the viewing time statistic indicative of the viewing time of a video source group according to a first embodiment of the present invention. The procedural steps of FIG. 5(A) is described as follows:

Step 501: Start.

Step 502: Accumulate the viewing time until the accumulated viewing time reaches the threshold of viewing time accumulation: In the first embodiment, the viewing time statistic indicative of the viewing time of a video source group is used as the criteria for prioritizing the scanning priority for each video source group. Therefore, it is set to increase the viewing time statistic calculated by a counter when the accumulated viewing time reaches a predetermined threshold of viewing time accumulation. For example, the predetermined threshold of viewing time accumulation can be set to 10 minutes. When the display device 100 receives input video signals from a video source and decodes the input video signals for playing, a timer (not shown) located within the CPU 110 is activated to start recording the viewing time of the video source. When the viewing time of the video source is accumulated up to the predetermined threshold of viewing time accumulation, that is, 10 minutes, the process continues with step 503.

Step 503: Determine if the currently-playing video source is the same as the previously-played video source. If the currently-playing video source is the same as the previously-played video source, the process continues with step 505. Otherwise, the process continues with step 504 to reset the timer of the CPU 110, and the execution of the process returns to the beginning of the process.

Step 505: Increase the viewing time statistic by 1: If the accumulated viewing time has reached the predetermined threshold of viewing time accumulation, the viewing time statistic indicative of viewing time of the video source group is increased by 1. The process then continues with step 506.

Step 506: Determine if the counter is overflowed: According to a practical aspect of the present invention, the counter 112 is consisted of a 2-byte data structure. However, the actual implementation of the counter 112 is not to be exhaustively limited to the form disclosed herein. If the counter 112 is consisted of a 2-byte data structure, the maximum countable value of the counter 112 should be 65535. At this step, if the count of the counter exceeds 65535, the process continues with step 507. Otherwise, the process continues with step 504 to reset the timer of the CPU 110, and the execution of the process returns to the beginning of the process.

Step 507: Start proportional distribution process or weighting distribution process for the statistic: If the count of the counter exceeds 65535, a proportional distribution process or weighting distribution process will be executed. The procedural steps of the proportional distribution routine or weighting distribution routine will be described below with reference to the flowcharts of FIG. 6 and FIG. 7.

Step 508: End.

Figure 5B:
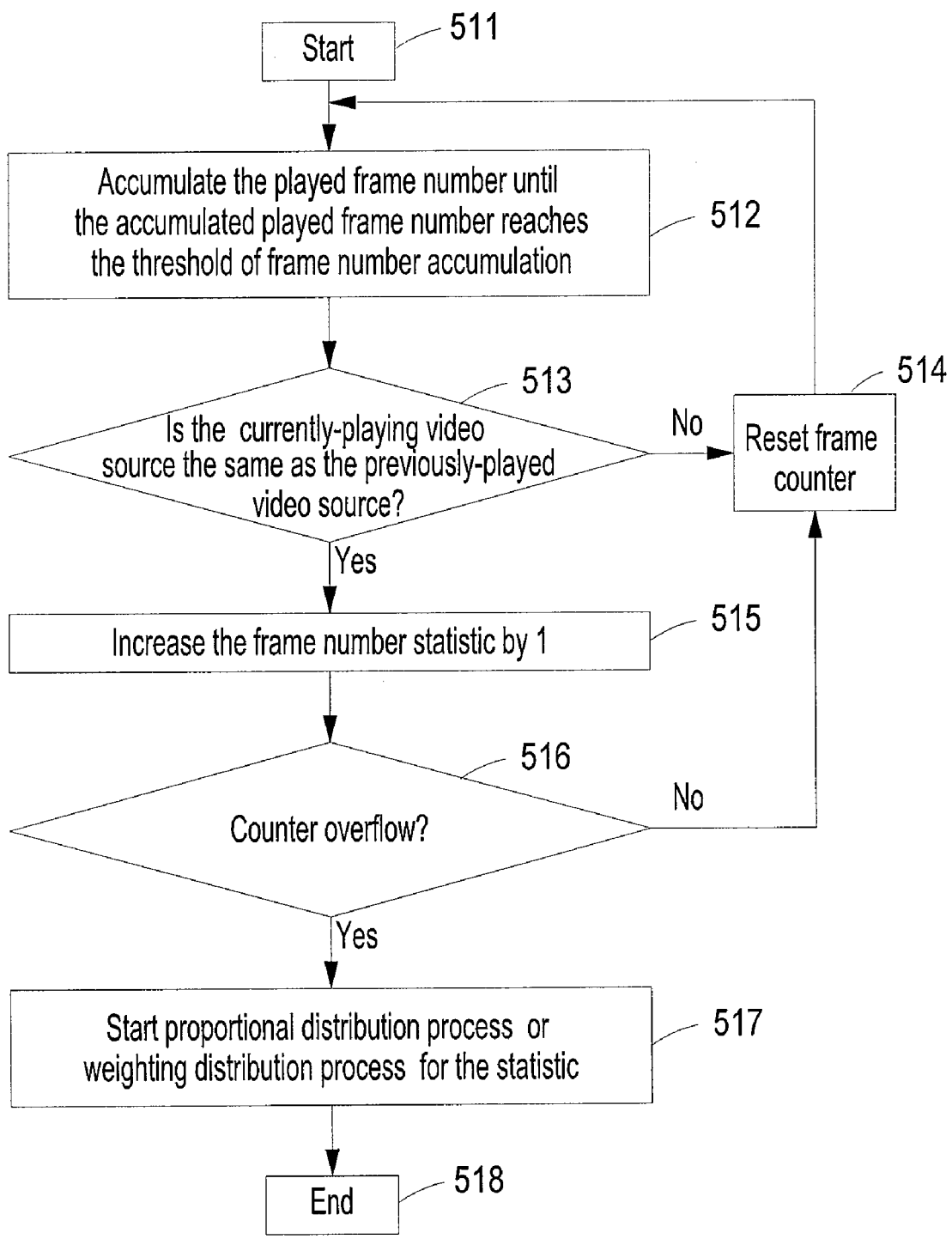
FIG. 5(B) illustrates an arithmetic process for calculating the frame number statistic indicative of the number of played frames of a video source group according to a second embodiment of the present invention.

FIG. 5(B) illustrates an arithmetic process for calculating the frame number statistic indicative of the number of played frames of a video source group according to a second embodiment of the present invention. The procedural steps of FIG. 5(B) is described as follows:

Step 511: Start.

Step 512: Accumulate the played frame number until the accumulated played frame number reaches the threshold of frame number accumulation: In the second embodiment, the frame number statistic indicative of the number of played frames of a video source group is used as the criteria for prioritizing the scanning priority for each video source group. Therefore, it is set to increase the frame number statistic calculated by a counter when the accumulated played frame number reaches a predetermined threshold of frame number accumulation. Taking an NTSC-format DVD as an example, the default frame rate of an NTSC-format DVD is set to 29.97 fps (about 30 fps). Therefore, the predetermined threshold of frame number accumulation can be set to 1800, which is about the number of played video frames for an NTSC-format DVD in one minute. When the display device 100 receives an input video signal from a video source and decodes the input video signal for playing, a frame counter (not shown) located within the CPU 110 is activated to start recording the number of played frames of the video source. When the frame number of the video source is accumulated up to the predetermined threshold of frame number accumulation, that is, 1800 frames, the process continues with step 513.

Step 513: Determine if the currently-playing video source is the same as the previously-played video source. If the currently-playing video source is the same as the previously-played video source, the process continues with step 515. Otherwise, the process continues with step 514 to reset the frame counter of the CPU 110, and the execution of the process returns to the beginning of the process.

Step 515: Increase the frame number statistic by 1: If the accumulated frame number has reached the predetermined threshold of frame number accumulation, the frame number statistic indicative of the number of played frames of the video source group is increased by 1. The process then continues with step 516.

Step 516: Determine if the counter is overflowed: According to a practical aspect of the present invention, the counter 112 is consisted of a 2-byte data structure. However, the actual implementation of the counter 112 is not to be exhaustively limited to the form disclosed herein. Suppose the counter 112 is consisted of a 2-byte data structure, the maximum countable value of the counter 112 should be 65535. At this step, if the count of the counter exceeds 65535, the process continues with step 517. Otherwise, the process continues with step 514 to reset the frame counter of the CPU 110, and the execution of the process returns to the beginning of the process.

Step 517: Start proportional distribution process or weighting distribution process for the statistic: If the count of the counter exceeds 65535, a proportional distribution process or weighting distribution process will be executed. The procedural steps of the proportional distribution routine or weighting distribution routine will be described below with reference to the flowcharts of FIG. 6 and FIG. 7.

Step 518: End.

Figure 6A:
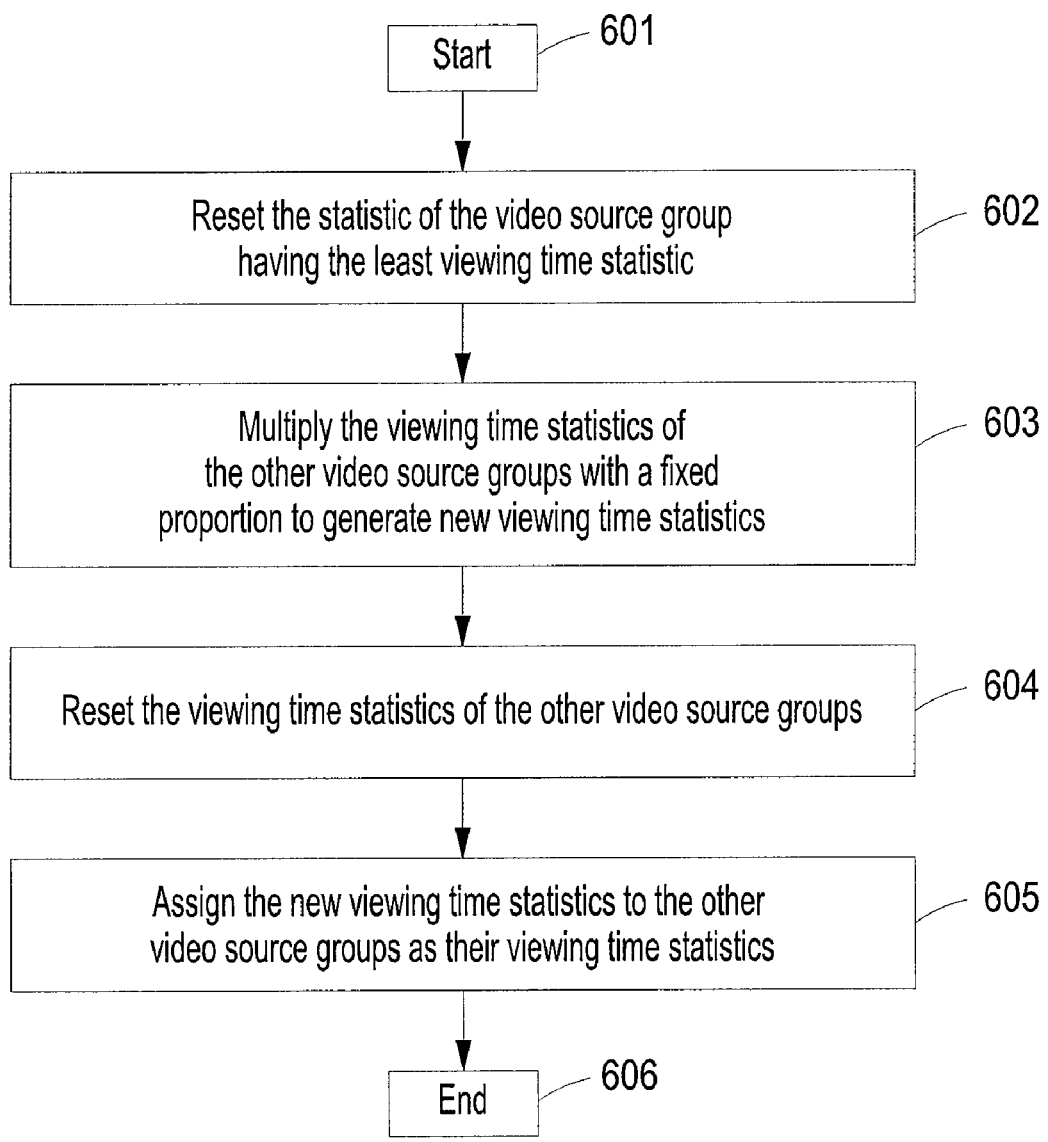
FIG. 6(A) illustrates the procedural steps of a proportional distribution routine for the statistic according to a first embodiment of the present invention.

FIG. 6(A) illustrates the procedural steps of a proportional distribution routine for the statistic according to a first embodiment of the present invention. The procedural steps of FIG. 6(A) will be described as follows:

Step 601: Start.

Step 602: Reset the statistic of the video source group having the least viewing time statistic: In this example, the mode of video source grouping is carried out with the topology as shown in FIG. 2(B), and the S-video video source group is assumed as the video source group having the least viewing time statistic. That is, the user seldom selects S-video video source to input video signals for viewing. Therefore, the viewing time statistic of the S-video video source group will be reset to zero. Next, the process continues with step 603.

Step 603: Multiply the viewing time statistics of the other video source groups with a fixed proportion to generate new viewing time statistics: For example, the viewing time statistics of the video source groups, except for the S-video video source group which has the least viewing time statistic, will be multiplied with a fixed proportion respectively, and the products are set as a new viewing time statistic for the CVBS video source group, SCART video source group, and Component video source group, respectively. Next, the process continues with step 604.

Step 604: Reset the viewing time statistics of the other video source groups: At this step, the viewing time statistics of the CVBS video source group, SCART video source group, and Component video source group will be reset to zero. Next, the process continues with step 605.

Step 605: Assign the new viewing time statistics to the other video source groups as their viewing time statistics: The new viewing time statistics obtained at the step 603 will be assigned to the CVBS video source group, SCART video source group, and Component video source group respectively as their viewing time statistics. Next, the process continues with step 606.

Step 606: End.

Figure 6B:
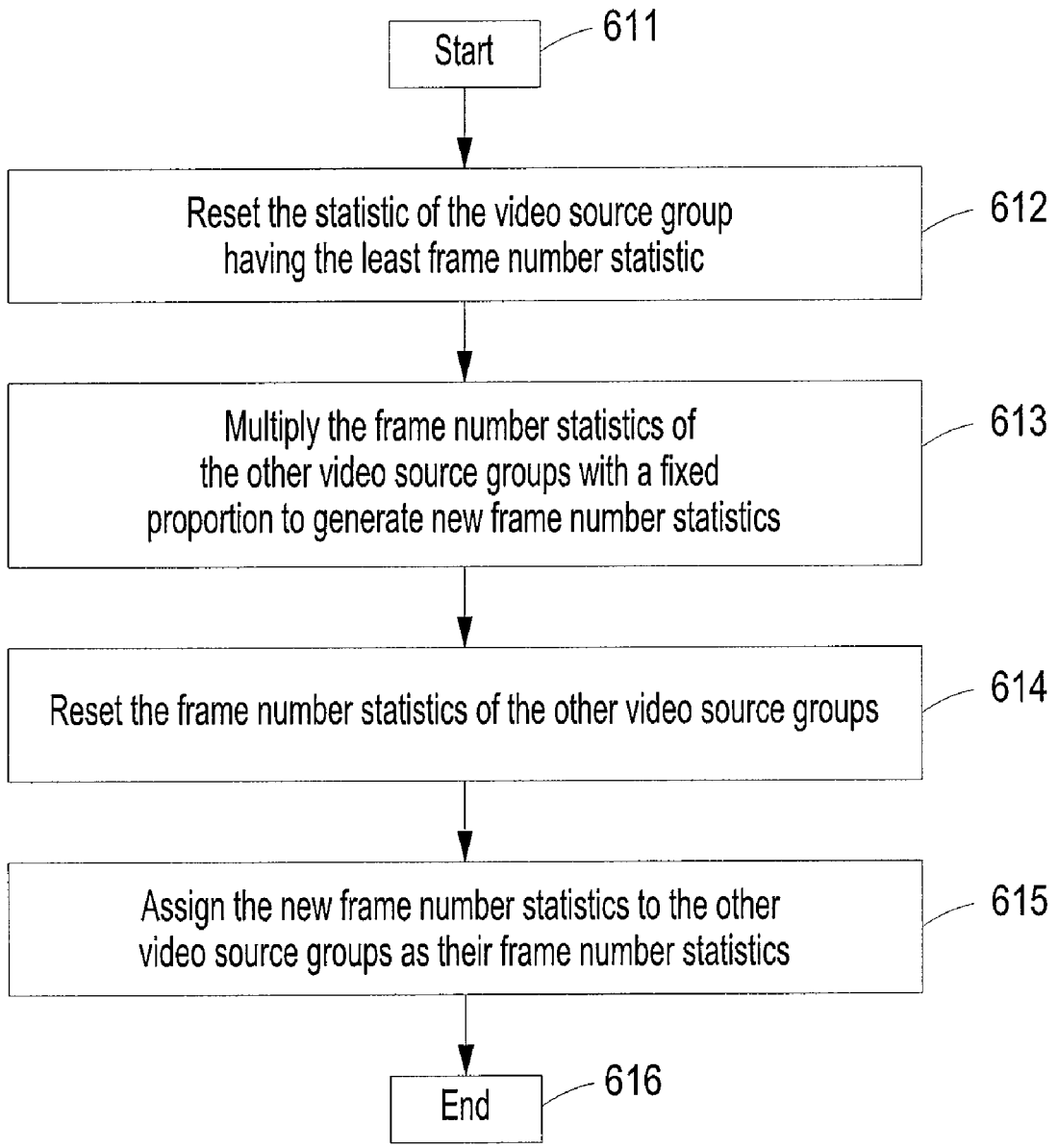
FIG. 6(B) illustrates the procedural steps of a proportional distribution routine for the statistic according to a second embodiment of the present invention.

FIG. 6(B) illustrates the procedural steps of a proportional distribution routine for the statistic according to a second embodiment of the present invention. The procedural steps of FIG. 6(B) will be described as follows:

Step 611: Start.

Step 612: Reset the statistic of the video source group having the least frame number statistic: In this example, the mode of video source grouping is carried out with the topology as shown in FIG. 2(B), and the S-video video source group is assumed as the video source group having the least frame number statistic. That is, the user seldom selects S-video video source to input video signals for viewing. Therefore, the frame number statistic of the S-video video source group will be reset to zero. Next, the process continues with step 613.

Step 613: Multiply the frame number statistic of the other video source groups with a fixed proportion to generate new frame number statistics: For example, the frame number statistics of the video source groups, except for the S-video video source group which has the least frame number statistic, will be multiplied with a fixed proportion respectively, and the products are set as a new frame number statistic for the CVBS video source group, SCART video source group, and Component video source group, respectively. Next, the process continues with step 614.

Step 614: Reset the frame number statistics of the other video source groups: At this step, the frame number statistics of the CVBS video source group, SCART video source group, and Component video source group will be reset to zero. Next, the process continues with step 615.

Step 615: Assign the new frame number statistics to the other video source groups as their frame number statistics: The new frame number statistics obtained at step 613 will be assigned to the CVBS video source group, SCART video source group, and Component video source group respectively as their frame number statistics. Next, the process continues with step 616.

Step 616: End.

Figure 7A:
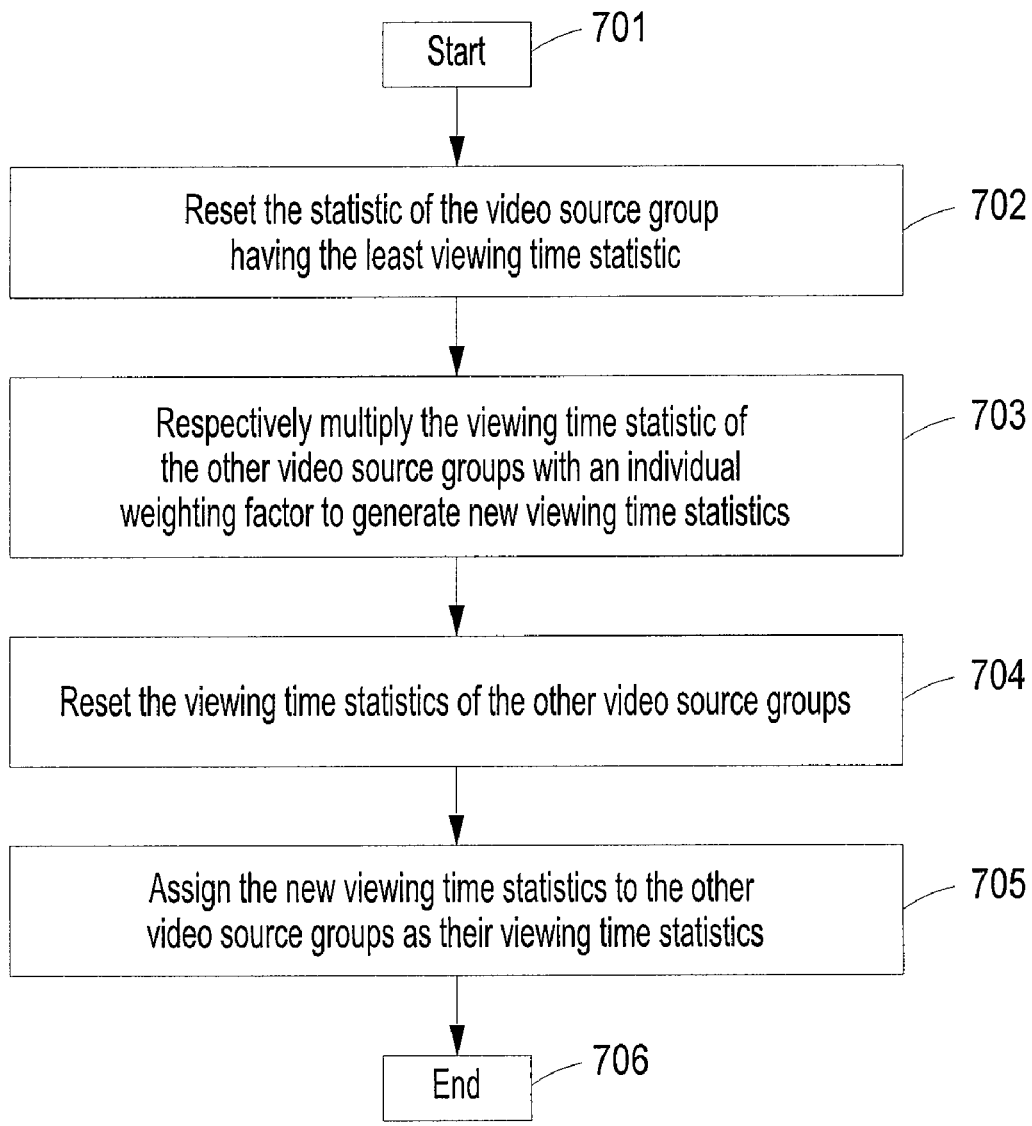
FIG. 7(A) illustrates the procedural steps of a weighting distribution routine for the statistic according to a first embodiment of the present invention.

FIG. 7(A) illustrates the procedural steps of a weighting distribution routine for the statistic according to a first embodiment of the present invention. The procedural steps of FIG. 7(A) will be described as follows:

Step 701: Start.

Step 702: Reset the statistic of the video source group having the least viewing time statistic: In this example, the mode of video source grouping is carried out with the topology as shown in FIG. 2(B), and the S-video video source group is assumed as the video source group having the least viewing time statistic. That is, the user seldom selects S-video video source to input video signals for viewing. Therefore, the viewing time statistic of the S-video video source group will be reset to zero. Next, the process continues with step 703.

Step 703: Respectively multiply the viewing time statistic of the other video source groups with an individual weighting factor to generate new viewing time statistics: For example, the viewing time statistics of the video source groups, except for the S-video video source group which has the least viewing time statistic, will be respectively multiplied with an individual weighting factor, and the products are set as a new viewing time statistic for the CVBS video source group, SCART video source group, and Component video source group, respectively. Next, the process continues with step 704.

Step 704: Reset the viewing time statistics of the other video source groups: At this step, the viewing time statistics of the CVBS video source group, SCART video source group, and Component video source group will be reset to zero. Next, the process continues with step 705.

Step 705: Assign the new viewing time statistics to the other video source groups as their viewing time statistics: The new viewing time statistics obtained at the step 703 will be assigned to the CVBS video source group, SCART video source group, and Component video source group respectively as their viewing time statistics. Next, the process continues with step 706.

Step 706: End.

Figure 7B:
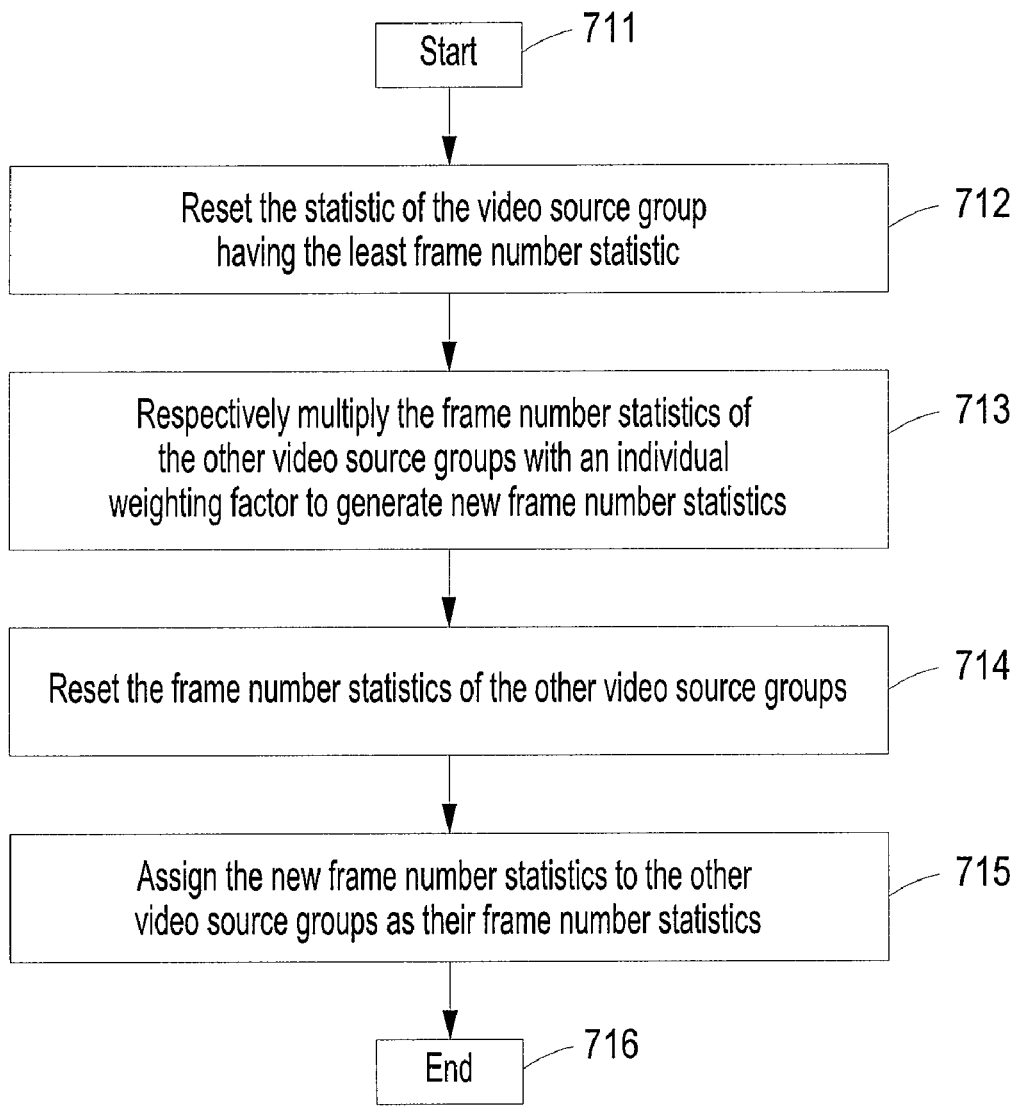
FIG. 7(B) illustrates the procedural steps of a weighting distribution routine for the statistic according to a second embodiment of the present invention.

FIG. 7(B) illustrates the procedural steps of a weighting distribution routine for the statistic according to a second embodiment of the present invention. The procedural steps of FIG. 7(B) will be described as follows:

Step 711: Start.

Step 712: Reset the statistic of the video source group having the least frame number statistic: In this example, the mode of video source grouping is carried out with the topology as shown in FIG. 2(B), and the S-video video source group is assumed as the video source group having the least frame number statistic. That is, the user seldom selects S-video video source to input video signals for viewing. Therefore, the frame number statistic of the S-video video source group will be reset to zero. Next, the process continues with step 713.

Step 713: Respectively multiply the frame number statistic of the other video source groups with an individual weighting factor to generate new frame number statistics: For example, the frame number statistics of the video source groups, except for the S-video video source group which has the least frame number statistic, will be respectively multiplied with an individual weighting factor, and the products are set as a new frame number statistic for the CVBS video source group, SCART video source group, and Component video source group, respectively. Next, the process continues with step 714.

Step 714: Reset the frame number statistics of the other video source groups: At this step, the frame number statistics of the CVBS video source group, SCART video source group, and Component video source group will be reset to zero. Next, the process continues with step 715.

Step 715: Assign the new frame number statistics to the other video source groups as their frame number statistics: The new frame number statistics obtained at the step 713 will be assigned to the CVBS video source group, SCART video source group, and Component video source group respectively as their frame number statistics. Next, the process continues with step 716.

Step 716: End.

Certainly, the present invention also provides a computer readable media having computer-executable instructions for enabling a computer to accomplish a scanning method for the video sources of a display device. The procedural steps of the scanning method for the video sources have been described without omission, and it is not intended to give details herein.

In conclusion, the present invention takes the viewing time statistic or the frame number statistic indicative of the viewing time or the number of played video frames of a video source group of a display device as the criteria for prioritizing the scanning priority for each video source group, such that the display device can readily and efficiently determine which video source has received an input video signal and decode the input video signal for playing. Using the inventive technique disclosed herein, the user is immune from manipulating the display device to scan each video source of the TV, and thereby provide a convenient solution for the display device to accomplish the scanning task for video sources.

While the present invention has been described in terms of what are presently considered to be the most practical and preferred embodiments, it is to be understood that the present invention need not be restricted to the disclosed embodiment. On the contrary, it is intended to cover various modifications and similar arrangements included within the spirit and scope of the appended claims which are to be accorded with the broadest interpretation so as to encompass all such modifications and similar structures. Therefore, the above description and illustration should not be taken as limiting the scope of the present invention which is defined by the appended claims.

What is claimed is:

1. A scanning method for scanning video sources of a display device, the method comprising the steps of:
   (a) grouping a plurality of video sources into a plurality of video source groups;
   (b) calculating a statistic for each video source group by a processor, wherein the statistic comprises a viewing time of each video source group;
   (c) prioritizing a scanning priority for each video source group according to the viewing time statistic of each video source group; and
   (d) scanning each video source group according to the scanning priority of each video source group to determine if there is a video signal inputted to the video sources.

2. The scanning method according to claim 1 wherein the step (a) includes the steps of: grouping the video sources sharing a shared audio channel into the same video source group.

3. The scanning method according to claim 2 wherein the step (b) includes the steps of:
   for each video source group, accumulating the viewing time of each video source group until an accumulated viewing time reaches a threshold for viewing time accumulation;
   determining if a currently-playing video source is identical to a previously-played video source; and
   when the currently-playing video source is identical to the previously-played video source, increasing the viewing time statistic of the video source group whose accumulated viewing time reaches the threshold for viewing time accumulation.

4. The scanning method according to claim 2 wherein the statistic comprises a played frame number of each video source group, and the step (b) includes the steps of:
   for each video source group, accumulating the played frame number of each video source group until an accumulated played frame number reaches a threshold for frame number accumulation;
   determining if a currently-playing video source is identical to a previously-played video source; and
   when the currently-playing video source is identical to the previously-played video source, increasing the frame number statistic of the video source group.

5. The scanning method according to claim 2 wherein the step (d) includes the steps of:
   prioritizing a scanning priority for each video source in a video source group according to a resolution of an input video signal specified by the video source; and
   scanning each video source of the video source group according to the scanning priority of each video source to determine if there is an input video signal inputted into a video source.

6. The scanning method according to claim 1 wherein the step (a) includes the steps of: grouping each video source into an individual video source group.

7. The scanning method according to claim 1 wherein the step (b) includes the steps of:
   for each video source group, accumulating the viewing time of each video source group until an accumulated viewing time reaches a threshold for viewing time accumulation; and
   when the accumulated viewing time reaches the threshold for viewing time accumulation, increasing a viewing time statistic of the video source group.

8. The scanning method according to claim 1 wherein the step (b) includes the steps of:

for each video source group, providing a counter to calculate a viewing time statistic of each video source group;
when the counter overflows, resetting the viewing time statistic of the video source group having the least viewing time statistic;
multiplying the viewing time statistics of the other video source groups with a fixed proportion to generates new viewing time statistics;
resetting the viewing time statistics of the other video source groups; and
assigning the new viewing time statistics to the other video source group.

9. The scanning method according to claim 1 wherein the step (b) includes the steps of:
for each video source group, providing a counter to calculate a viewing time statistic of each video source group;
when the counter overflows, resetting the viewing time statistic of the video source group having the least viewing time statistic;
respectively multiplying the viewing time statistics of the other video source groups with an individual weighting factor to generates new viewing time statistics;
resetting the viewing time statistics of the other video source groups; and
assigning the new viewing time statistics to the other video source group.

10. The scanning method according to claim 1 wherein the statistic comprises a played frame number of each video source group, and the step (b) includes the steps of:
for each video source group, accumulating the played frame number of each video source group until an accumulated played frame number reaches a threshold for frame number accumulation; and
when the accumulated played frame number reaches the threshold for frame number accumulation, increasing a frame number statistic of the video source group.

11. The scanning method according to claim 1 wherein the statistic comprises a played frame number of each video source group, and the step (b) includes the steps of:
for each video source group, providing a counter to calculate a frame number statistic of each video source group;
when the counter overflows, resetting the frame number statistic of the video source group having the least frame number statistic;
multiplying the frame number statistics of the other video source groups with a fixed proportion to generates new frame number statistics;
resetting the frame number statistics of the other video source groups; and
assigning the new frame number statistics to the other video source group.

12. The scanning method according to claim 1 wherein the statistic comprises a played frame number of each video source group, and the step (b) includes the steps of:
for each video source group, providing a counter to calculate a frame number statistic of each video source group;
when the counter overflows, resetting the frame number statistic of the video source group having the least frame number statistic;
respectively multiplying the frame number statistics of the other video source groups with an individual weighting factor to generates new frame number statistics;
resetting the frame number statistics of the other video source groups; and
assigning the new frame number statistics to the other video source group.

13. The scanning method according to claim 1 wherein the scanning method is executed by a central processing unit of the display device.

14. The scanning method according to claim 1 wherein the display device is a TV or projector.

15. A non-transitory computer readable media having computer-executable instructions for enabling a computer to accomplish a scanning method for video sources of a display device, wherein the scanning method comprising the steps of:
(a) grouping a plurality of video sources into a plurality of video source groups;
(b) calculating a statistic for each video source group, wherein the statistic comprises a viewing time of each video source group;
(c) prioritizing a scanning priority for each video source group according to the viewing time statistic of each video source group; and
(d) scanning each video source group according to the scanning priority of each video source group to determine if there is a video signal inputted to the video sources.

16. The non-transitory computer readable media according to claim 15 wherein the step (a) of the scanning method for video sources includes the steps of:
grouping the video sources sharing a shared audio channel into the same video source group.

17. The non-transitory computer readable media according to claim 16 wherein the step (b) of the scanning method for video sources includes the steps of:
for each video source group, accumulating the viewing time of each video source group until an accumulated viewing time reaches a threshold for viewing time accumulation;
determining if a currently-playing video source is identical to a previously-played video source; and
when the currently-playing video source is identical to the previously-played video source, increasing the viewing time statistic of the video source group.

18. The non-transitory computer readable media according to claim 16 wherein the statistic comprises a played frame number of each video source group, and the step (b) of the scanning method for video sources includes the steps of:
for each video source group, accumulating the played frame number of each video source group until an accumulated played frame number reaches a threshold for frame number accumulation;
determining if a currently-playing video source is identical to a previously-played video source; and
when the currently-playing video source is identical to the previously-played video source, increasing the frame number statistic of the video source group.

19. The non-transitory computer readable media according to claim 16 wherein the step (d) of the scanning method for video sources includes the steps of:
prioritizing a scanning priority for each video source in a video source group according to a resolution of an input video signal specified by the video source; and
scanning each video source of the video source group according to the scanning priority of each video source to determine if there is an input video signal inputted into a video source.

20. The non-transitory computer readable media according to claim 15 wherein the step (a) of the scanning method for video sources includes the steps of:
grouping each video source into an individual video source group.

21. The non-transitory computer readable media according to claim 15 wherein the step (b) of the scanning method for video sources includes the steps of:
- for each video source group, accumulating the viewing time of each video source group until an accumulated viewing time reaches a threshold for viewing time accumulation; and
- when the accumulated viewing time reaches the threshold for viewing time accumulation, increasing a viewing time statistic of the video source group.

22. The non-transitory computer readable media according to claim 15 wherein the step (b) of the scanning method for video sources includes the steps of:
- for each video source group, providing a counter to calculate a viewing time statistic of each video source group;
- when the counter overflows, resetting the viewing time statistic of the video source group having the least viewing time statistic;
- multiplying the viewing time statistics of the other video source groups with a fixed proportion to generates new viewing time statistics;
- resetting the viewing time statistics of the other video source groups; and
- assigning the new viewing time statistics to the other video source group.

23. The non-transitory computer readable media according to claim 15 wherein the step (b) of the scanning method for video sources includes the steps of:
- for each video source group, providing a counter to calculate a viewing time statistic of each video source group;
- when the counter overflows, resetting the viewing time statistic of the video source group having the least viewing time statistic;
- respectively multiplying the viewing time statistics of the other video source groups with an individual weighting factor to generates new viewing time statistics;
- resetting the viewing time statistics of the other video source groups; and
- assigning the new viewing time statistics to the other video source group.

24. The non-transitory computer readable media according to claim 15 wherein the statistic comprises a played frame number of each video source group, and the step (b) of the scanning method for video sources includes the steps of:
- for each video source group, accumulating the played frame number of each video source group until an accumulated played frame number reaches a threshold for frame number accumulation; and
- when the accumulated played frame number reaches the threshold for frame number accumulation, increasing a frame number statistic of the video source group.

25. The non-transitory computer readable media according to claim 15 wherein the statistic comprises a played frame number of each video source group, and the step (b) of the scanning method for video sources includes the steps of:
- for each video source group, providing a counter to calculate a frame number statistic of each video source group;
- when the counter overflows, resetting the frame number statistic of the video source group having the least frame number statistic;
- multiplying the frame number statistics of the other video source groups with a fixed proportion to generates new frame number statistics;
- resetting the frame number statistics of the other video source groups; and
- assigning the new frame number statistics to the other video source group.

26. The non-transitory computer readable media according to claim 15 wherein the statistic comprises a played frame number of each video source group, and the step (b) of the scanning method for video sources includes the steps of:
- for each video source group, providing a counter to calculate a frame number statistic of each video source group;
- when the counter overflows, resetting the frame number statistic of the video source group having the least frame number statistic;
- respectively multiplying the frame number statistics of the other video source groups with an individual weighting factor to generates new frame number statistics;
- resetting the frame number statistics of the other video source groups; and
- assigning the new frame number statistics to the other video source group.

27. The non-transitory computer readable media according to claim 15 wherein the display device is a TV or projector.

* * * * *